United States Patent
Teletia et al.

(10) Patent No.: US 9,805,093 B2
(45) Date of Patent: *Oct. 31, 2017

(54) EXECUTING STORED PROCEDURES AT PARALLEL DATABASES

(71) Applicant: Microsoft Technology Licensing, LLC, Redmond, WA (US)

(72) Inventors: Nikhil Teletia, Madison, WI (US); Alan Dale Halverson, Verona, WI (US); Artem D. Yegorov, Aliso Viejo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/824,094

(22) Filed: Aug. 12, 2015

(65) Prior Publication Data

US 2015/0347513 A1 Dec. 3, 2015

Related U.S. Application Data

(63) Continuation of application No. 13/831,724, filed on Mar. 15, 2013, now Pat. No. 9,128,990.

(51) Int. Cl.
*G06F 17/30* (2006.01)

(52) U.S. Cl.
CPC .. *G06F 17/30477* (2013.01); *G06F 17/30415* (2013.01); *G06F 17/30442* (2013.01);
(Continued)

(58) Field of Classification Search
None
See application file for complete search history.

(56) References Cited

U.S. PATENT DOCUMENTS

| 5,864,843 | A | * | 1/1999 | Carino, Jr. | ........ G06F 17/30607 |
| 5,873,083 | A | * | 2/1999 | Jones | ................ G06F 17/30595 |

(Continued)

OTHER PUBLICATIONS

Dwjunkie, "Parallel Data Warehouse (POW) POC—Lessons Learned Part 2", Published on: May 11, 2012, Available at: http://nexxtjump.com/2012/05/11/parallel-data-warehouse-pdw-poc-lessons-learned-part-2.

(Continued)

*Primary Examiner* — Belix M Ortiz Ditren
(74) *Attorney, Agent, or Firm* — Michael B. Dodd; Dodd Law Group

(57) ABSTRACT

The present invention extends to methods, systems, and computer program products for executed stored procedures at parallel databases. Stored procedures are transformed so that execution of the stored procedure is split between a standalone database server and a parallel database coordinator. Execution of the stored procedure is initiated at the standalone database server. At execution time, control-flow statements, variable assignment, expression evaluation, etc., are handled by the standalone database server. SQL statements are passed from the standalone database server to the database for the execution. Results from executed SQL statements can be returned to the standalone database server or to a client. The parallel database coordinator can be added as a linked server to the standalone database server. In some embodiments, a session token is used to share session state between different parties.

20 Claims, 7 Drawing Sheets

(52) U.S. Cl.
CPC .. *G06F 17/30445* (2013.01); *G06F 17/30545* (2013.01); *G06F 17/30864* (2013.01)

(56) References Cited

U.S. PATENT DOCUMENTS

| | | | |
|---|---|---|---|
| 6,507,834 | B1 | 1/2003 | Kabra et al. |
| 6,636,855 | B2 | 10/2003 | Holloway et al. |
| 7,047,535 | B2 | 5/2006 | Lee et al. |
| 7,448,047 | B2 | 11/2008 | Poole et al. |
| 8,260,468 | B2 | 9/2012 | Ippolito et al. |
| 2003/0014393 | A1* | 1/2003 | Kabra ............... G06F 17/30415 |
| 2003/0023773 | A1 | 1/2003 | Lee et al. |
| 2012/0023132 | A1 | 1/2012 | Shulman et al. |

OTHER PUBLICATIONS

"SQL Server Parallel Data Warehouse Connection Type (SSRS)", Retrieved Date: Feb. 11, 2013, Available at: https://msdn.microsoft.com/en-us/library/ff519548.aspx.

"Notice of Allowance Issued in U.S. Appl. No. 13/831,724", dated May 13, 2015, 7 Pages.

"Non-Final Office Action Issued in U.S. Appl. No. 13/831,724", dated Nov. 20,2014, 9 Pages.

"International Preliminary Report on Patentability for PCT Application No. PCT/US2014/022222", daed Feb. 6, 2015, 7 Pages.

"International Search Report & Written Opinion for PCT Application No. PCT/US2014/022222", dated Jul. 8, 2014, 10 Pages.

\* cited by examiner

| Original | After Transformation |
|---|---|
| SELECT query without any parameters<br><br>CREATE PROCEDURE test1<br>AS<br>SELECT *<br>FROM customer | CREATE PROCEDURE test1<br>AS<br>EXECUTE ('SELECT *<br>      FROM customer'<br>) AT [LINKED DB] |
| | Alternatively, OPENQUERY can be used.<br><br>CREATE PROCEDURE test1<br>AS<br>SELECT *<br>FROM OPENQUERY<br>   ([LINKED DB],<br>    'SELECT *<br>    FROM customer'<br>   ) A |

*Fig. 4A*

| Original | After Transformation |
|---|---|
| SELECT query with parameters<br><br>CREATE PROCEDURE test1<br>AS<br>SELECT *<br>FROM customer<br>WHERE c_custkey = @cid | Since this query has a parameter, EXECUTE is used:<br><br>CREATE PROCEDURE test1<br>AS<br>EXECUTE ('SELECT *<br>  FROM customer<br>  WHERE c_custkey =<br>  ?',@cid<br>  ) AT [LINKED DB] |

*Fig. 4B*

| Original | After Transformation |
|---|---|
| SELECT query with variable assignments but no parameters<br><br>CREATE PROCEDUE test1<br>AS<br>SELECT @count = count(*)<br>FROM customer | CREATE PROCEDURE test1<br>AS<br>EXECUTE ('SELECT ? = count(*)<br>      FROM customer ',<br>      @count  OUTPUT<br>) AT [LINKED DB] |
| | Alternatively, OPENQUERY can be used.<br><br>CREATE PROCEDURE test1<br>AS<br>SELECT @count = alias1<br>FROM OPENQUERY<br>   ([LINKED DB],<br>    'SELECT count(*) alias1<br>    FROM customer'<br>   ) |

*Fig. 4C*

| Original | After Transformation |
|---|---|
| Scalar subquery without parameters<br><br>CREATE PROCEDURE test1<br>AS<br>SET @count = SELECT count(*)<br>FROM customer | CREATE PROCEDURE test1<br>AS<br>SET @count = SELECT *<br>      FROM OPENQUERY([LINKED DB],<br>           'SELECT count(*)<br>FROM customer') A |

*Fig. 4D*

| Original | After Transformation |
|---|---|
| CREATE PROCEDURE test1<br>AS<br>IF (SELECT count(*)<br>   FROM customer)<br>   > 100<br>BEGIN<br>...<br>END | CREATE PROCEDURE test1<br>AS<br>IF (SELECT *<br>   FROM OPENQUERY([LINKED DB],<br>        'SELECT count(*)<br>        FROM customer')<br>)<br>   > 100<br>BEGIN<br>...<br>END |

*Fig. 4E*

| Original | After Transformation |
|---|---|
| CREATE PROCEDURE test1<br>AS<br>SELECT *<br>INTO temptable<br>FROM customer | CREATE PROCEDURE test1<br>AS<br>EXECUTE('SELECT *<br>   INTO temptable<br>   FROM customer') AT [LINKED DB] |

*Fig. 4F*

EXECUTING STORED PROCEDURES AT PARALLEL DATABASES

CROSS-REFERENCE TO RELATED APPLICATIONS

This application is a continuation of and claims the benefit of and priority to U.S. patent application Ser. No. 13/831,724, entitled "Executing Stored Procedures At Parallel Databases", filed Mar. 15, 2013 by Nikhil Teletia et al., the entire contents of which are expressly incorporated by reference.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In some environments, queries are issued against a corpus of data to facilitate targeted information retrieval from the corpus of data. A user (or even a computer system) formulates a query using constructs from a query language. A query language typically includes a number of constructs that can be grouped into different combinations to express a logical intent for retrieving data. The query is issued to a data management system for processing. The data management system translates the query into a corresponding set of compatible physical operations (sometimes and hereinafter referred to as a "query plan") for realizing the expressed logical intent. The query plan can then be executed to retrieve data from the corpus of data in accordance with the expressed logical intent. Retrieved data can be returned to the query issuer.

For example, SQL can be used to formulate a query for retrieving data from a relational database. The query is issued to a database management system that controls access to the relational database. The database management system translates the query into a query plan. The query plan is then executed to retrieve data from the relational database. The retrieved database data can be returned to the query issuer.

Some database systems are standalone (or single node) database systems where all data and optimization data is physically stored at the same machine. Other database systems are parallel database systems. In a parallel database system, database storage is spread across a number of compute nodes. Each compute node stores one or more portions of a database locally. Other modules (e.g., at a control node) abstract the distributed nature of the database from users such that it appears as a single unified database. As such, in a parallel database system, data relevant to a query as well as data used for query plan optimization can be spread out across a number of different nodes.

Supporting the execution of batched and stored procedures against a parallel database has at least a number of difficulties and/or inefficiencies. At least one difficulty is preserving equivalent single system behavior within a parallel database execution environment. The same behavior can be implemented at each compute node in a parallel database. However, implementing the same behavior at each compute can result in duplicated effort and performance of redundant operations.

BRIEF SUMMARY

The present invention extends to methods, systems, and computer program products for executing stored procedures at parallel databases. A parallel database coordinator is configured to issue SQL statements against a parallel database. The parallel database includes a plurality of database partitions spread across a plurality of compute nodes. The parallel database coordinator is also connected to an instance of standalone database server.

The parallel database coordinator receives a request to create a stored procedure. The creation request includes a name and stored procedure statements. The stored procedure is to include one or more SQL statements. The stored procedure can optionally also include at least one other non-SQL statement (e.g., control flow, variable assignment, expression evaluation, etc.). The parallel database coordinator transforms the stored procedure statements so that the one or more SQL statements are passed backed to the parallel database coordinator when the stored procedure is executed. The request to create the stored procedure is then forwarded to the standalone database server. The standalone database server creates and stores the transformed stored procedure.

Subsequently, the parallel database coordinator receives an execution request from a client. The execution request requests execution of the stored procedure. The parallel database coordinator forwards the execution request to the standalone database server. The standalone database server executes the transformed stored procedure. During execution at the standalone database server, the transformed stored procedure sends a request to execute a SQL statement (from among the one or more SQL statements) to the parallel database coordinator. The parallel database coordinator receives the request to execute the SQL statement form the standalone database server.

The parallel database coordinator executes the SQL statement against the parallel database. The parallel database coordinator receives results from executing the SQL statement against the parallel database. Depending on the type of the SQL statement, the parallel database coordinator returns the results to the standalone database server or to the client. When appropriate, the standalone database server receives the results from the parallel database coordinator. The standalone database server uses the results during execution of the at least one other non-SQL statement at the standalone database server.

Accordingly, execution of statements in the transformed stored procedure is split between the parallel database coordinator and the standalone database server. The parallel database coordinator executes SQL statements while the standalone database server handles other non-SQL statements, such as, flow control statements, variable assignments, expression evaluation, etc.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 4A-4F illustrate various procedures in original formats and in corresponding transformed formats.

DETAILED DESCRIPTION

Figure 1A:
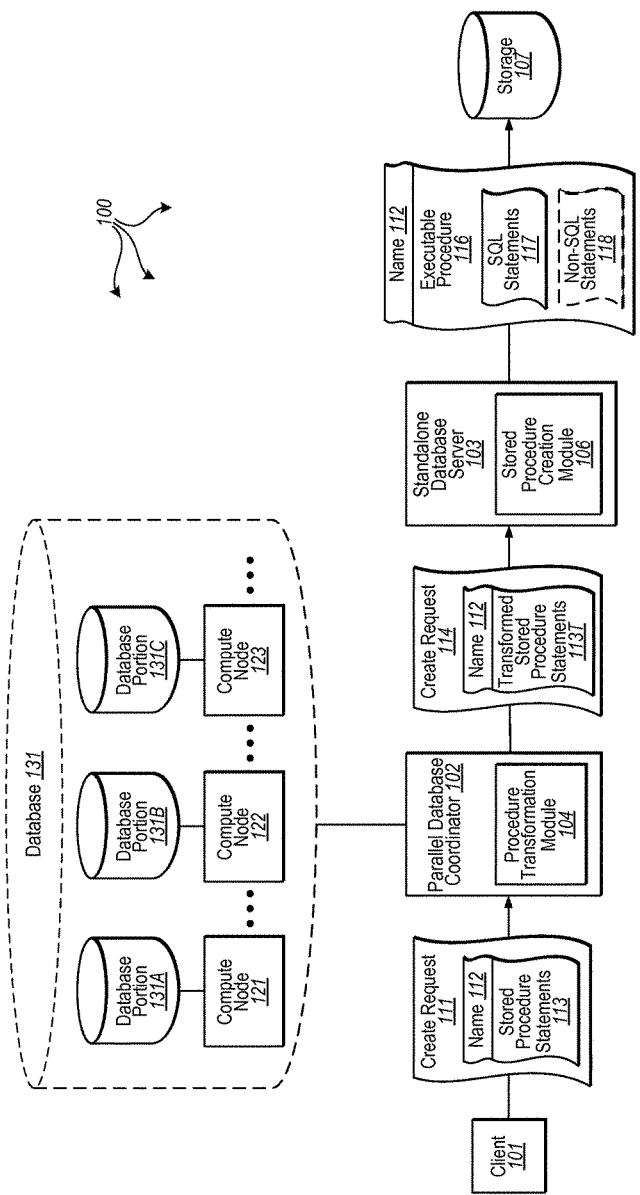
FIGS. 1A and 1B illustrates an example computer architecture that facilitates crating and executing stored procedures at parallel databases.

The present invention extends to methods, systems, and computer program products for executing stored procedures at parallel databases. A parallel database coordinator is configured to issue SQL statements against a parallel database. The parallel database includes a plurality of database partitions spread across a plurality of compute nodes. The parallel database coordinator is also connected to an instance of standalone database server.

The parallel database coordinator receives a request to create a stored procedure. The stored procedure includes one or more SQL statements. The stored procedure can optionally also include at least one other non-SQL statement (e.g., control flow, variable assignment, expression evaluation, etc.). The parallel database coordinator transforms the stored procedure so that the one or more SQL statements are passed backed to the parallel database coordinator when the stored procedure is executed. The request to create the stored procedure is then forwarded to the standalone database server. The standalone database server creates and stores the transformed stored procedure.

Subsequently, the parallel database coordinator receives an execute request from a client. The execution request requests execution of the stored procedure. The parallel database coordinator forwards the execution request to the standalone database server. The standalone database server executes the transformed stored procedure. During execution at the standalone database server, the transformed stored procedure sends a request to execute a SQL statement (from among the one or more SQL statements) to the parallel database coordinator. The parallel database coordinator receives the request to execute the SQL statement form the standalone database server.

The parallel database coordinator executes the SQL statement against the parallel database. The parallel database coordinator receives results from executing the SQL statement against the parallel database. Depending on the type of the SQL statement, the parallel database coordinator returns the results to the standalone database server or to the client. When appropriate, the standalone database server receives the results from the parallel database coordinator. The standalone database server uses the results to execute the at least one other non-SQL statement at the standalone database server.

Accordingly, execution of statements in the transformed stored procedure is split between the parallel database coordinator and the standalone database server. The parallel database coordinator executes SQL statements while the standalone database server handles other non-SQL statements, such as, flow control statements, variable assignments, expression evaluation, etc.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In general, embodiments of the invention transform a stored procedure so that execution of the stored procedure is split between a standalone database server (e.g., a shell database) and a parallel database coordinator (e.g., a parallel data warehouse (PDW) engine). Execution of the stored procedure is initiated at the standalone database server. At execution time, control-flow statements, variable assignment, expression evaluation, etc., are handled by (or centralized at) the standalone database server. SQL statements (e.g., SELECT, CREATE, DELETE, UPDATE, INSERT, etc.) are passed from the standalone database server to the parallel database coordinator for the execution. Results from executed SQL statements can be returned to the standalone database server or to a client. The parallel database coordinator can be added as a linked server to the standalone database server. Statements, such as, for example, OPENQUERY, EXECUTE AT, can be used to pass SQL from the standalone database server to the parallel database coordinator. In some embodiments, a session token is used to share session state between different parties.

Figure 1B:
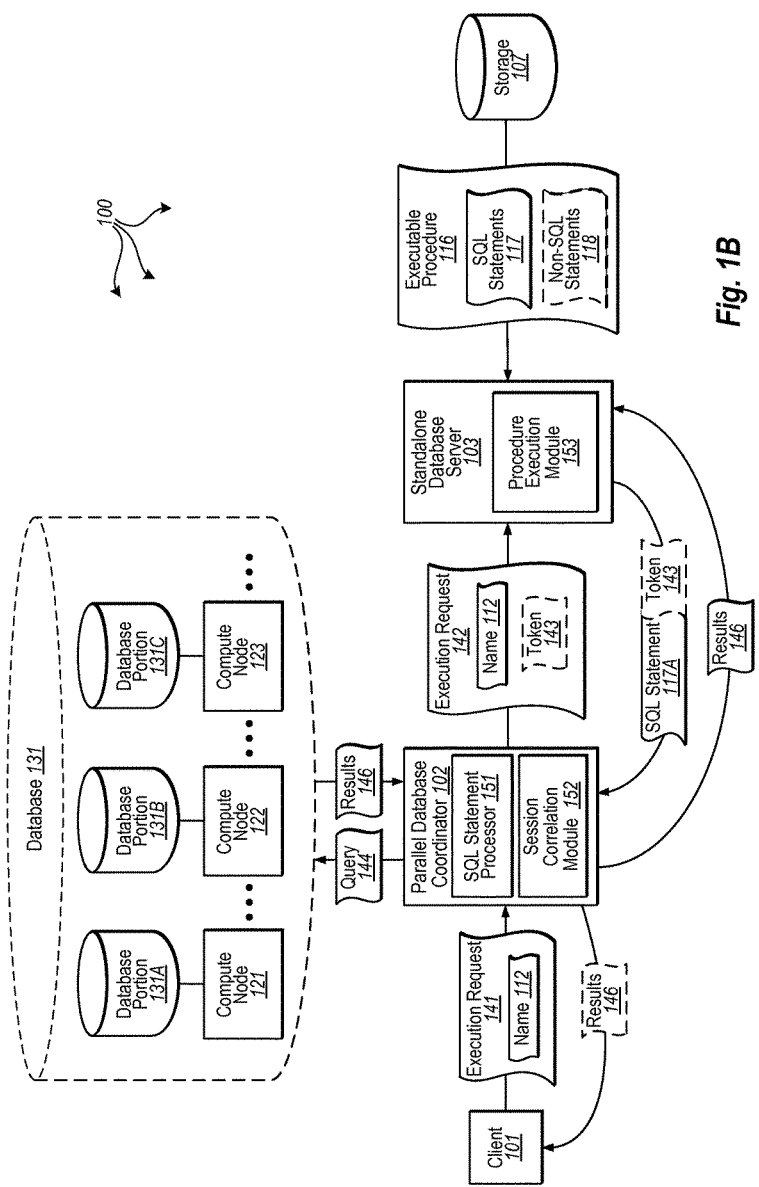

FIGS. 1A and 1B illustrates an example computer architecture 100 that facilitates crating and executing stored procedures at parallel databases. Referring to FIG. 1A, computer architecture 100 includes client 101, parallel database coordinator 102, standalone database server 103, database 141, and storage 107. Each of client 101, parallel database coordinator 102, standalone database server 103, database 141, and storage 107 can be connected to one another over (or be part of) a network, such as, for example, a Local Area Network ("LAN"), a Wide Area Network ("WAN"), and even the Internet. Accordingly, client 101, parallel database coordinator 102, standalone database server 103, database 141, and storage 107 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network.

Referring now to FIG. 1A, client 101 can be a database client. Client 101 can provide a user interface for interacting with data stored in database 131. Client 101 can send requests to create stored procedures to parallel database coordinator 102. Stored procedure creation requests can include a name to use for the stored procedure and stored procedure statements that are to be executed.

Parallel database coordinator 102 (e.g., a Parallel Data Warehouse (PDW) engine) can receive requests from client 101. When a stored procedure creation request is received, procedure transformation module 104 can transform stored procedure statements of the request. The transformation can cause any SQL statements in the stored procedure statements to be returned to parallel database coordinator 102 for processing when the stored procedure is executed. Parallel database coordinator 102 can then send the stored procedure creation request with the name and the transformed stored procedure statements to standalone database server 103.

Standalone database server 130 (e.g., a shell database) can receive the stored procedure creation request. Stored procedure creation module 103 can create an executable procedure from the transformed stored procedure statements. Standalone database server 130 can store the name along with the executable procedure in storage 107.

Database 131 includes database portions 131A, 131B, and 131C and compute nodes 121, 122, and 123. Compute nodes 121, 122, and 123 can be configured in a shared-nothing architecture. As such, each of compute nodes 121, 122, and 123 maintain separate memory (e.g., RAM) and separate storage resources (e.g., disk drives) from other nodes. Database 131 is distributed across computer node 121, 122, and 123, which maintain database portions 131A, 131B, and 131C respectively. Parallel database coordinator 102 can include abstraction hardware and/or software components that abstract the distributed nature of database 131. Parallel database coordinator 109 can use the abstraction hardware and/or software components to present database 131 as a standalone database to client 101. Thus, client 101 can interact with database 131 using commands compatible with a standalone database (including submitting queries).

Figure 2:
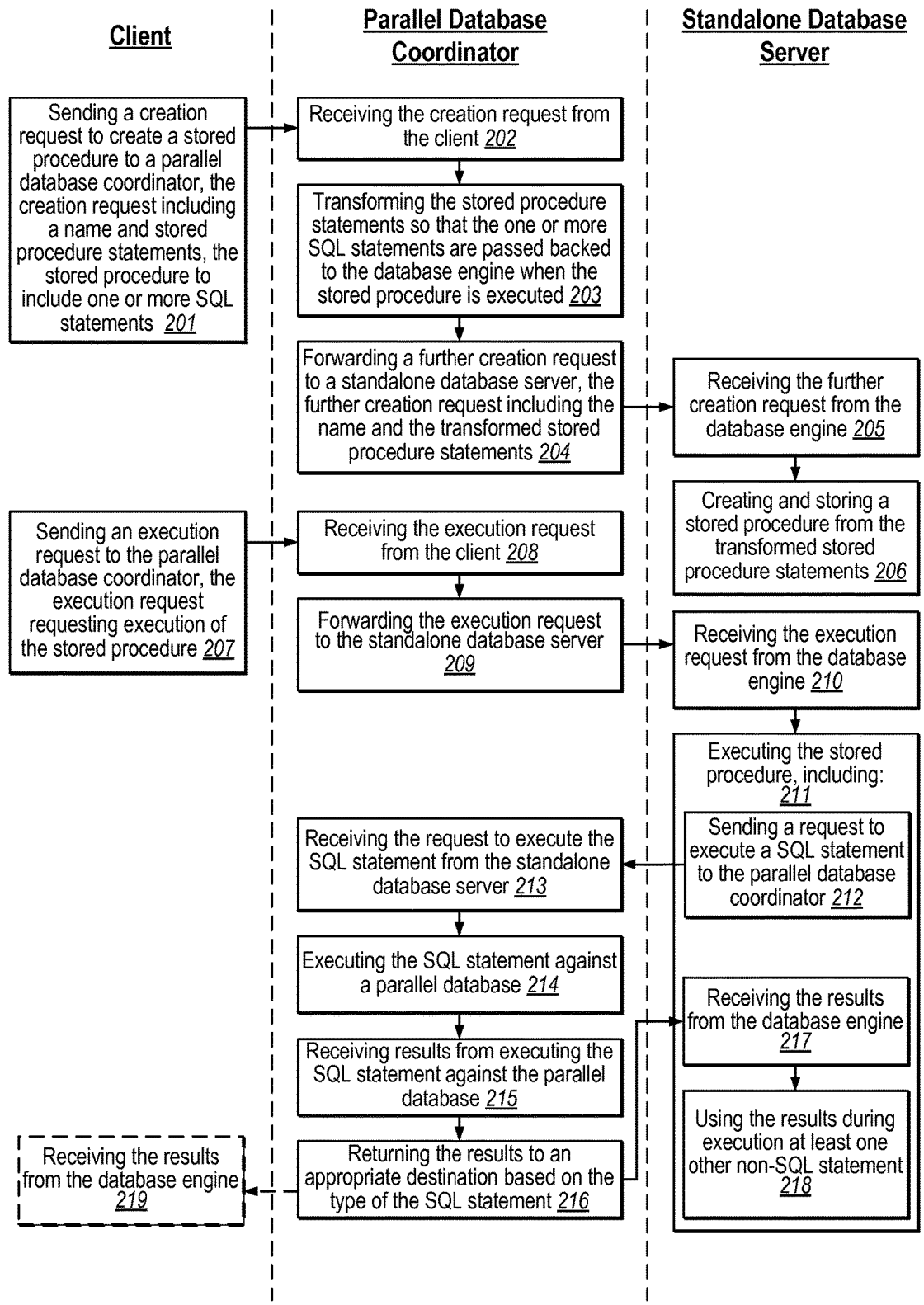
FIG. 2 illustrates a flow chart of an example method for creating and executing stored procedures at parallel databases.

FIG. 2 illustrates a flow chart of an example method 200 for creating and executing stored procedures at parallel databases. Method 200 will be described with respect to the components and data of computer architecture 100.

Method 200 includes sending a creation request to create a stored procedure to a parallel database coordinator, the creation request including a name and stored procedure statements, the stored procedure to include one or more SQL statements (201). The stored procedure can also optionally include at least one non-SQL statement. For example, client 101 can send created request 111 to parallel database coordinator 102. Create request 111 contains name 112 and stored procedure statements 113. Name 112 indicates the name to be given to the stored procedure. Stored procedure statements 113 are to be used to create an executable procedure. Stored procedure statements 113 can include SQL statements and potentially also non-SQL statements (e.g., control flow statements, variable assignments, expression evaluations, etc.). Method 200 includes receiving the creation request from the client (202). For example, parallel database coordinator 102 can receive create request 111 from client 101.

Method 200 includes transforming the stored procedure statements so that the one or more SQL statements are passed backed to the parallel database coordinator when the stored procedure is executed (203). For example, procedure transformation module 104 can transform stored procedure statements 113 into transformed stored procedure statements 113T. Any SQL statements in stored procedure statements 113 can be transformed in transformed stored procedure statements 113T so that the SQL statements are passed back to parallel database coordinator 103 during execution.

FIGS. 4A-4F depict various transforms that facilitate transferring SQL statements back to a parallel database coordinator. In some embodiments, SELECT statements are transformed using either an EXECUTE statement or an OPENQUERY statement. A parallel database coordinator can be added into stored procedure statements as a linked database (e.g., "[LINKED DB]") so that EXECUTE or OPENQUERY statements are passed back to the parallel database coordinator during execution.

FIG. 4A depicts two possible transformations for SELECT query without any parameters. FIG. 4B depicts a possible transformation for SELECT query with parameters. FIG. 4C depicts two possible transformations for SELECT query with variable assignments but no parameters. FIG. 4D depicts a possible transformation for scalar subquery without parameters. FIG. 4E depicts a possible transformation for a scalar query within a control flow statement. FIG. 4F depicts a possible transformation for a SELECT query with an INTO statement without any parameters.

Any number of other transformations is also possible. In some embodiments, transformations can be facilitated by extending the grammar accepted by a parallel database coordinator's parser. In other embodiments, OPENQUERY can be extended to accept parameters.

Returning to FIG. 2, method 200 includes forwarding a further creation request to a standalone database server, the further creation request including the name and the transformed stored procedure statements (204). For example, parallel database coordinator 102 can forwards create request 114 to standalone database server 103. As depicted, create request 114 includes name 112 and transformed stored procedure statements 113T. Method 200 includes receiving the further creation request from the parallel database coordinator (205). For example, standalone database server 103 can receive created request 114.

Method 200 includes creating and storing a stored procedure from the transformed stored procedure statements (206). For example, stored procedure creation module 106 can create executable procedure 116 from transformed stored procedure statements 113T. Executable procedure 116 includes executable code representing SQL statements 117 and potentially also representing non-SQL statements 118. Standalone database server 103 can store executable procedure 116 along with name 112 in storage 107.

Turning to FIG. 1B, client 101 can also send requests to execute stored procedures to parallel database coordinator 102. Stored procedure execution requests can include the name of a stored procedure that is to be executed. Parallel database coordinator 102 can receive the stored procedure execution request from client 101. In response, parallel database coordinator 102 can forward the stored procedure execution request, including the name of a stored procedure that is to be executed, to standalone database server 103.

When appropriate, session correlation module 152 can generate a session token. Parallel database coordinator 102 can attach the session token to the forwarded stored procedure execution request. The session token can be used to share session state the client may have, including transactions, database context, etc. as well as authorize the request without having to store and pass user credentials to parallel database coordinator when the stored procedure is subsequently executed.

Standalone database server 103 can receive the stored procedure execution request from parallel database coordinator 102. Procedure execution module 153 can refer to store 107 to identify a stored procedure having the included name. The stored procedure can be a stored procedure created from transformed stored procedure statements such that any SQL statements are passed to parallel database coordinator 102 during execution. Procedure execution module 153 can initiate execution of the stored procedure at standalone database server 103.

During execution, non-SQL statements (e.g., control flow, variable assignments, expression evaluation, etc.) are executed at standalone database server 103. When SQL statements (e.g., enclosed in EXECUTE AT or OPENQUERY) are encountered, the SQL statements are forwarded to parallel database coordinator 102 (based on parallel database coordinator 102 being a linked database). When appropriate, a session token (previously received from parallel database coordinator 102) can be attached to any SQL statement passed to parallel database coordinator 102.

As such, during execution of a stored procedure, parallel database coordinator 102 can receive SQL statements, possibly along with a session token, from standalone database server 103. When a session token is received, session correlation module 152 can use the session token to align execution of the SQL statement with state for client 101. That is, the SQL statement can be executed under the same session as the stored procedure execution request originally received from client 101. SQL statement processor 151 can execute the SQL statement to submit a query to database 131. Database 131 can return query results back to parallel database coordinator 102.

The query results can be returned to standalone database server 103 or can be returned to client 101. Whether results are returned standalone database server 103 or to client 101 can be based on the type of the SQL statement. For example, a scalar subquery result can be returned to standalone database server 103. On the other hand, a normal SELECT statement's result can be returned to client 101.

Procedure execution module 153 can use returned results during the execution of other non-SQL statements, such as, for example, to make control flow decisions, assign a value to a variable, or evaluate an expression.

During execution of a stored procedure, any number of SQL statements can be set to parallel database coordinator 102 and results returned back to standalone database server 103 or to client 101.

Returning again to FIG. 2, method 200 includes sending an execution statement to the parallel database coordinator, the execution request requesting execution of the stored procedure (207). For example, client 101 can send execute request 141 to parallel database coordinator 102. Execution request 141 can request execution of a stored procedure with name 112. Method 200 includes receiving the execution request from the client (208). For example, parallel database coordinator 102 can receive execution request 141 from client 101.

Method 200 includes forwarding the execution request to the standalone database server (209). For example, parallel database coordinator 102 can parse execution request 141 and forward corresponding execution request 142 to standalone database server 103. When appropriate, session correlation module 152 can generate session token 143 for the session between client 101 and parallel database coordinator 102. Session correlation module 152 can attach session token 143 to execution request 142. Method 200 includes receiving the execution request from the parallel database coordinator (210). For example, standalone database server 130 can receive execution request 142 from parallel database coordinator 102.

Method 200 includes executing the stored procedure (211). For example, in response to receiving execution request 142, procedure execution module 153 can determine that name 112 corresponds to executable procedure 116. As such, procedure execution module 153 can initiate execution of executable procedure 116. Execution of SQL statements 117 and non-SQL statements 118 can be split between parallel database coordinator 102 and standalone database server 103 respectively.

Method 200 includes sending a request to execute a SQL statement to the parallel database coordinator (212). During execution of executable procedure 116, SQL statements 117 and non-SQL statements 118 can be encountered. Encountered SQL statements (e.g., wrapped inside EXECUTE AT or OPENQUERY) can be send to parallel database coordinator 102 for execution. For example, procedure execution module 153 can send SQL statement 117A (an SQL statement included in SQL statements 117) to parallel database coordinator 102. When appropriate, session token 143 can be sent along with SQL statement 117A to parallel database coordinator 102.

Method 200 includes receiving the request to execute the SQL statement from the standalone database server (213). For example, parallel database coordinator 102 can receive SQL statement 117A from standalone database server 103. When appropriate, parallel database coordinator 102 can receive session token 143 along with SQL statement 117A. Session correlation module 152 can use session token 143 to align SQL statement 117A to the session between client 101 and parallel database coordinator 102.

Method 200 includes executing the SQL statement against a parallel database (214). For example, SQL statement processor 151 can execute SQL statement 117A against database 131. Executing SQL statement 117A can include parallel database coordinator 102 submitting query 144 to database 131. Method 200 includes receiving results from executing the SQL statement against the parallel database (215). For example, parallel database coordinator 102 can receive results 146 (for query 144) from executing SQL statement 117A against database 131.

Method 200 includes returning the results to an appropriate destination based on the type of the SQL statement (216). For example, parallel database coordinator 102 can return results 146 to standalone database server 103. Alternately, results 146 can be returned to client 101. Whether results are return to standalone database 103 to client 101 can be depending on the type of SQL statement 117A. For example, if SQL statement 117A returns a scalar subquery result, results 146 can be returned to standalone database server 103. On the other hand, if SQL statement 117A is a normal SELECT statement, results 146 can be returned to client 101.

Method 200 includes receiving the results from the parallel database coordinator (at the standalone database server) (217). For example, standalone database server 103 can receive results 146 from parallel database coordinator 102. Method 200 includes using the results during execution of at least one other non-SQL statement (218). For example, procedure execution module 153 can use results 146 during execution of at least one of non-SQL statements 118. Alternately, method 200 includes receiving the results from the parallel database coordinator (at the client) (219). For example, client 101 can receive results 146.

As appropriate, 212 through 218 can be repeated for any other SQL statements included in SQL statements 117.

Figure 3:
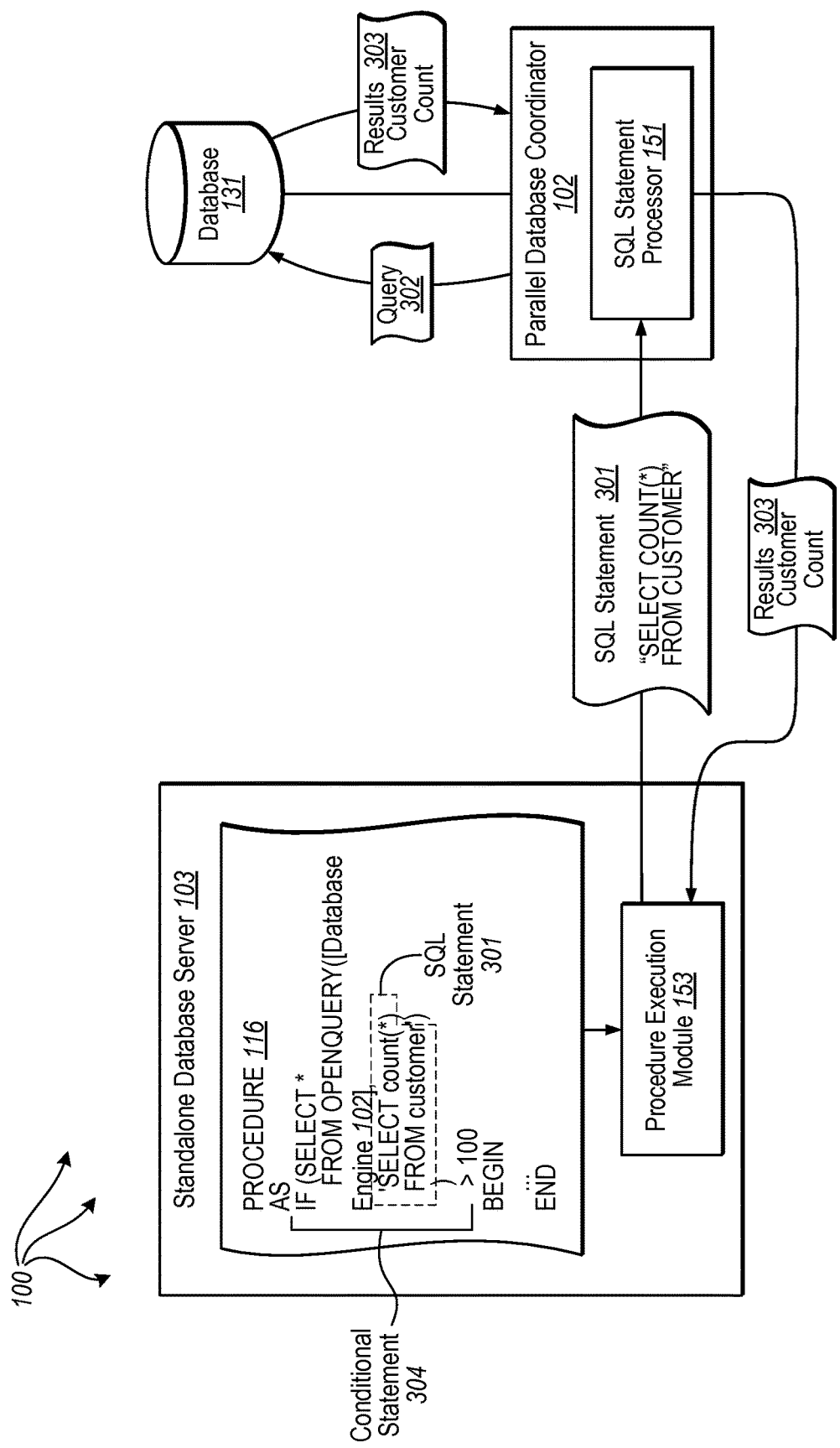
FIG. 3 illustrates a more detailed example of splitting stored procedure execution between a standalone database server and a parallel database coordinator.

FIG. 3 illustrates a more detailed example of splitting stored procedure execution between standalone database server 103 and a parallel database coordinator 102. As depicted, procedure execution module 153 is executing procedure 116. During execution, SQL statement 301 is sent to parallel database coordinator 102. SQL statement processor 151 processes SQL statement 301 to submit query 302 to database 131. Query 302 can request the number of entries in a customer table. SQL statement processor can receive back results 303 in response to submitted query 302. Results 303 can include the number of entries in the customer table.

SQL statement processor 151 can return results 303 to procedure execution module 153. Procedure execution module 153 can receive results 303 from SQL statement processor 151. Procedure execution module 153 can use results 303 in evaluating conditional statement 304 at standalone database server 103. As such, during execution of procedure 116, SQL statement 301 is executed at parallel database coordinator 102 and conditional statement 304 is executed at standalone database 103.

To support additional stored procedure specific behavior, embodiments of the invention can used a dedicated callback port hosted by parallel database coordinator 102. The callback port is hosted exposing a parallel database coordinator endpoint internally to a control node SQL Server. The control node SQL server has a linked server registered connecting to that endpoint via its OLEDB provider. Exposure of the port can be limited to the boundary of the control node so that no client authentication is used for the linked server to communicate to the port. Instead, a session token can be generated at the time of user session creation and can be appended to any query sent from the SQL Server to Engine process via the linked server.

Since a different port boundary is exposed, responsibility of the host behind the port can be extended to be able to strip the session token from an incoming query, validate the query, and attach the query execution on to the associated session. As such, any session state a user may have can be shared, including transactions, database context, etc. The session token can also be used to authorize the request without having to store and pass users credentials to the linked server all the time. The session token can be disposed of at the end of the user session. Logic to parse session tokens can be disabled for the external requests and enabled for the internal port.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A processor implemented method for executing a stored procedure at a database server, the method comprising:
    receiving, from a database coordinator, an execution request requesting execution of the stored procedure at the database server, the stored procedure including a data access statement and a non-data access statement, the stored procedure having been transformed by enclosing the data access statement in a command in the stored procedure, the command referencing the database coordinator as a linked server so that when the stored procedure is executed at the database server the data access statement is passed back to the database coordinator; and
    splitting execution of the stored procedure between the database server and the database coordinator by:
        sending a request to execute the data access statement back to the database coordinator based on the command referencing the database coordinator as a linked server, the request requesting execution of the data access statement against a parallel database;
        receiving results from the database coordinator, the results derived by executing the data access statement against the parallel database; and
        using the results during execution of the non-data access statement at the database server.

2. The method of claim 1, further comprising accessing the stored procedure from storage.

3. The method of claim 1, wherein receiving an execution request comprises receiving an execution request requesting execution of a stored procedure, the stored procedure having been transformed by wrapping a SQL statement in a command in the stored procedure.

4. The method of claim 3, wherein sending a request to execute the data access statement back to the database coordinator comprises sending a request to execute the SQL statement back to the database coordinator.

5. The method of claim 1, further comprising prior to receiving the execution request:
    receiving a creation request from the database coordinator, the creation request requesting creation of the stored procedure, the creation request including a name and transformed stored procedure statements, the transformed stored procedure statements configured so that the data access statement is passed back to the database coordinator during execution of the stored procedure; and
    creating the stored procedure from the transformed stored procedure statements.

6. The method of claim 5, wherein receiving a creation request comprises receiving a creation request having transformed stored procedure statements that wrap the data access statement inside one of: EXECUTE AT and OPENQUERY.

7. The method of claim 1, wherein receiving an execution request comprises receiving a session token for the execution request from the database coordinator; and
    wherein sending a request to execute the data access statement back to the database coordinator comprises sending the session token back to the database coordinator along with the request to execute the data access statement.

8. The method of claim 1, wherein sending a request to execute the data access statement back to the database coordinator comprises sending a request to execute a SQL statement against a parallel database.

9. The method of claim 8, wherein sending a request to execute a SQL statement against a parallel database comprises sending a request to execute a SQL statement selected from among: SELECT, CREATE, DELETE, UPDATE, and INSERT.

10. The method of claim 1, wherein the database coordinator is a Parallel Data Warehouse (PDW) engine.

11. A computer system, the computer system comprising:
    one or more processors;
    system memory coupled to the one or more processors, the system memory storing instructions that are executable by the one or more processors; and
    the one or more processors executing the instructions stored in the system memory to execute a stored procedure, including the following:
        receive, from a database coordinator, an execution request requesting execution of the stored procedure at the database server, the stored procedure including a data access statement and a non-data access statement, the stored procedure having been transformed by enclosing the data access statement in a command in the stored procedure, the command referencing the database coordinator as a linked server so that when the stored procedure is executed at the database server the data access statement is passed back to the database coordinator; and
        split execution of the stored procedure between the database server and the database coordinator, including:
            send a request to execute the data access statement back to the database coordinator based on the command referencing the database coordinator as a linked server, the request requesting execution of the data access statement against a parallel database;
            receive results from the database coordinator, the results derived by executing the data access statement against the parallel database; and
            use the results during execution of the non-data access statement at the database server.

12. The computer system of claim 11, further comprising the one or more processors executing the instructions to access the stored procedure from storage.

13. The computer system of claim 11, wherein the the one or more processors executing the instructions to receive an execution request comprises the the one or more processors executing the instructions to receive an execution request requesting execution of a stored procedure, the stored procedure having been transformed by wrapping a SQL statement in a command in the stored procedure.

14. The computer system of claim 13, wherein the the one or more processors executing the instructions to send a request to execute the data access statement to the database coordinator comprise the the one or more processors executing the instructions to send a request to execute the SQL statement to the database coordinator.

15. The computer system of claim 11, wherein the one or more processors executing the instructions to receive an execution request comprises the the one or more processors executing the instructions to receive a session token for the execution request; and wherein the the one or more processors executing the instructions to send a request to execute the data access statement to the database coordinator comprises the the one or more processors executing the instructions to send a request to execute a SQL statement against a parallel database and the session token to the database coordinator.

16. The computer system of claim 15, wherein the the one or more processors executing the instructions to send a request to execute a SQL statement against a parallel database comprise the the one or more processors executing the instructions to send a request to execute a SQL statement selected from among: SELECT, CREATE, DELETE, UPDATE, and INSERT.

17. The computer system of claim 11, wherein the database coordinator is a Parallel Data Warehouse (PDW) engine.

18. A computer program product for use at a computer system, the computer program product for implementing a method for executing a stored procedure, the computer program product comprising one or more computer storage devices having stored thereon computer-executable instructions, which in response to execution at a processor, cause the computer system to perform the method, including the following:

receive, from a database coordinator, an execution request requesting execution of the stored procedure at the database server, the stored procedure including a data access statement and a non-data access statement, the stored procedure having been transformed at the database coordinator by enclosing the data access statement in a command in the stored procedure, the command referencing the database coordinator as a linked server so that when the stored procedure is executed at the database server the data access statement is passed back to the database coordinator; and split execution of the stored procedure between the database server and the database coordinator, including:
  send a request to execute the data access statement back to the database coordinator based on the command referencing the database coordinator as a linked server, the request requesting execution of the data access statement against a parallel database;
  receive results from the database coordinator, the results derived by executing the data access statement against the parallel database; and
  use the results during execution of the non-data access statement at the database server.

19. The computer program product of claim 18, further comprising computer-executable instructions which, in response to execution, cause the computer system to:

receive a creation request from the database coordinator, the creation request requesting creation of the stored procedure, the creation request including a name and transformed stored procedure statements, the transformed stored procedure statements configured so that the data access statement is passed back to the database coordinator during execution of the stored procedure; and create the stored procedure from the transformed stored procedure statements.

20. The computer program product of claim 17, wherein computer-executable instructions which, in response to execution, cause the computer system to receive an execution request comprise computer-executable instructions which, in response to execution, cause the computer system to receive a session token for the execution request; and wherein computer-executable instructions which, in response to execution, cause the computer system to send a request to execute the data access statement to the database coordinator comprise computer-executable instructions which, in response to execution, cause the computer system to send a request to execute a SQL statement against a parallel database and the session token to the database coordinator.

* * * * *